US007824172B2

(12) United States Patent
Azzar et al.

(10) Patent No.: US 7,824,172 B2
(45) Date of Patent: *Nov. 2, 2010

(54) FOOD PORTIONING SYSTEM

(76) Inventors: James D. Azzar, c/o Azzar Store Equipment, 201 Cottage Grove, SE., Grand Rapids, MI (US) 49507; Stevens C. Steketee, c/o Azzar Store Equipment, 201 Cottage Grove, SE., Grand Rapids, MI (US) 49507

( * ) Notice: Subject to any disclaimer, the term of this patent is extended or adjusted under 35 U.S.C. 154(b) by 819 days.

This patent is subject to a terminal disclaimer.

(21) Appl. No.: 11/181,806

(22) Filed: Jul. 15, 2005

(65) Prior Publication Data

US 2006/0013915 A1    Jan. 19, 2006

Related U.S. Application Data

(60) Provisional application No. 60/587,933, filed on Jul. 15, 2004.

(51) Int. Cl.
*A23P 1/10* (2006.01)

(52) U.S. Cl. ............... 425/437; 425/149; 425/150; 425/406; 426/513; 426/516; 264/334; 264/335

(58) Field of Classification Search ........... 425/437, 425/149, 150, 406; 426/612, 513, 516
See application file for complete search history.

(56) References Cited

U.S. PATENT DOCUMENTS

| 3,898,314 | A |   | 8/1975 | Church |
|---|---|---|---|---|
| 4,057,382 | A | * | 11/1977 | Yamamori ............... 425/387.1 |
| 4,129,159 | A | * | 12/1978 | Whetstone ................ 141/1 |
| 4,578,027 | A | * | 3/1986 | Koppa et al. ............. 425/298 |
| 4,832,961 | A | * | 5/1989 | Aoki ...................... 425/239 |
| 4,987,643 | A | * | 1/1991 | Powers et al. ............ 425/139 |
| 5,445,512 | A | * | 8/1995 | Bradley et al. ........... 425/193 |
| 5,645,869 | A | * | 7/1997 | Riubrugent ............... 425/149 |
| 5,795,610 | A | * | 8/1998 | London ................... 426/512 |
| 5,980,228 | A | * | 11/1999 | Soper .................... 425/145 |

* cited by examiner

*Primary Examiner*—Yogendra N Gupta
*Assistant Examiner*—Emmanuel S Luk
(74) *Attorney, Agent, or Firm*—Sughrue Mion, PLLC

(57) ABSTRACT

A food portioning system to efficiently output portion food material, the system including a hopper, a mold plate, air knockout assembly, and air and hydraulic cylinders. Flowable food material is put into the hopper where it is pushed into the mold cavity of the mold plate. By the action of the air and hydraulic cylinders, the mold plate is driven to a knockout position where the air knockout assembly releases compressed air onto the mold cavity to knock out the portioned food from the mold cavity.

12 Claims, 9 Drawing Sheets

FOOD PORTIONING SYSTEM

CROSS-REFERENCE TO RELATED APPLICATIONS

This application claims the benefit of U.S. Provisional Application No. 60/587,933, filed on Jul. 15, 2004, at the U.S. Patent and Trademark Office, the disclosures of which are incorporated herein by reference in their entirety.

BACKGROUND OF THE INVENTION

1. Field of the Invention

Apparatus and methods consistent with the present invention relate to food portioning machines, and more particularly, apparatuses and methods for a food portioning system for knocking out food portions out of a mold with air and using hydraulic and air cylinders to operate the food portioning system.

2. Description of the Related Art

In a conventional food portioning machine, there is a hopper, knockout assembly, and a mold plate disposed underneath the mold plate. In operation, flowable food material is entered into the hopper and fed into the mold plate which is driven toward the knockout assembly. The knockout assembly is a complicated mechanical system that includes a knockout cup attached at the end of a vertical knockout shaft. By the action of springs and levers, the knockout shaft is repetitively moved up and down to knock out the portioned food in the mold plate. There are, however, several problems associated with this conventional arrangement.

First, the mechanical system of arms, shafts, springs, and knockout cups requires tight tolerances to allow the knockout plate to repetitively move through the mold plate without obstruction. The vertical and horizontal positions of the center arm and the knockout cup have to be maintained at specific tolerances to prevent unnecessary chafing between the knockout cup and the mold plate. Moreover, the mechanical system requires a high level of maintenance to keep the system in precise working order.

Furthermore, the mechanical movement of the knockouts presents safety considerations in that an operator of the food portioning machine may injure himself by reaching inside the machine during operation.

Additionally, the output of the machine with respect to the rate of food portions knocked out is limited in part, by the physical movement of the knockout plates.

SUMMARY

To solve the above problems, the present invention is conceived.

A system for making portioned food includes a hopper assembly comprising a tumbler; an air knockout assembly disposed adjacent to said hopper assembly, said air knockout assembly comprising an air vent member; a mold plate having a mold cavity, said mold plate slideably disposed under said hopper assembly and said air knockout assembly; a plurality of cylinders comprising: a first hydraulic cylinder coupled to said tumbler of the hopper assembly; a second hydraulic cylinder coupled to said mold plate; and an air cylinder coupled to said second hydraulic cylinder; generating compressed air for said air knockout assembly; and a control circuit controlling operations of the system.

The present invention further includes a food portioning apparatus including means for receiving and ejecting food into a mold cavity of a mold plate; means for pushing out portioned food using pneumatic pressure; a plurality of driving means comprising: first means for driving said means for receiving and ejecting food; second means for driving said mold plate; and third means for generating compressed air for said means for pushing out portioned food; and means for controlling operations of said system.

BRIEF DESCRIPTION OF THE DRAWINGS

Other features and advantages of the present invention will be apparent from the following description taken in connection with the accompanying drawings, wherein.

DETAILED DESCRIPTION OF AN EXEMPLARY EMBODIMENT

A system according to one aspect of the present invention includes a hopper, a mold plate, air knockout assembly, and a set of air and hydraulic drive means. Flowable food material is put into the hopper where it is pushed into the mold cavity of the mold plate. The mold plate is driven to a knockout position by the hydraulic cylinder. Here, an air knockout assembly releases compressed air onto the mold cavity to knock out the portioned food from the mold plate.

Figure 1:
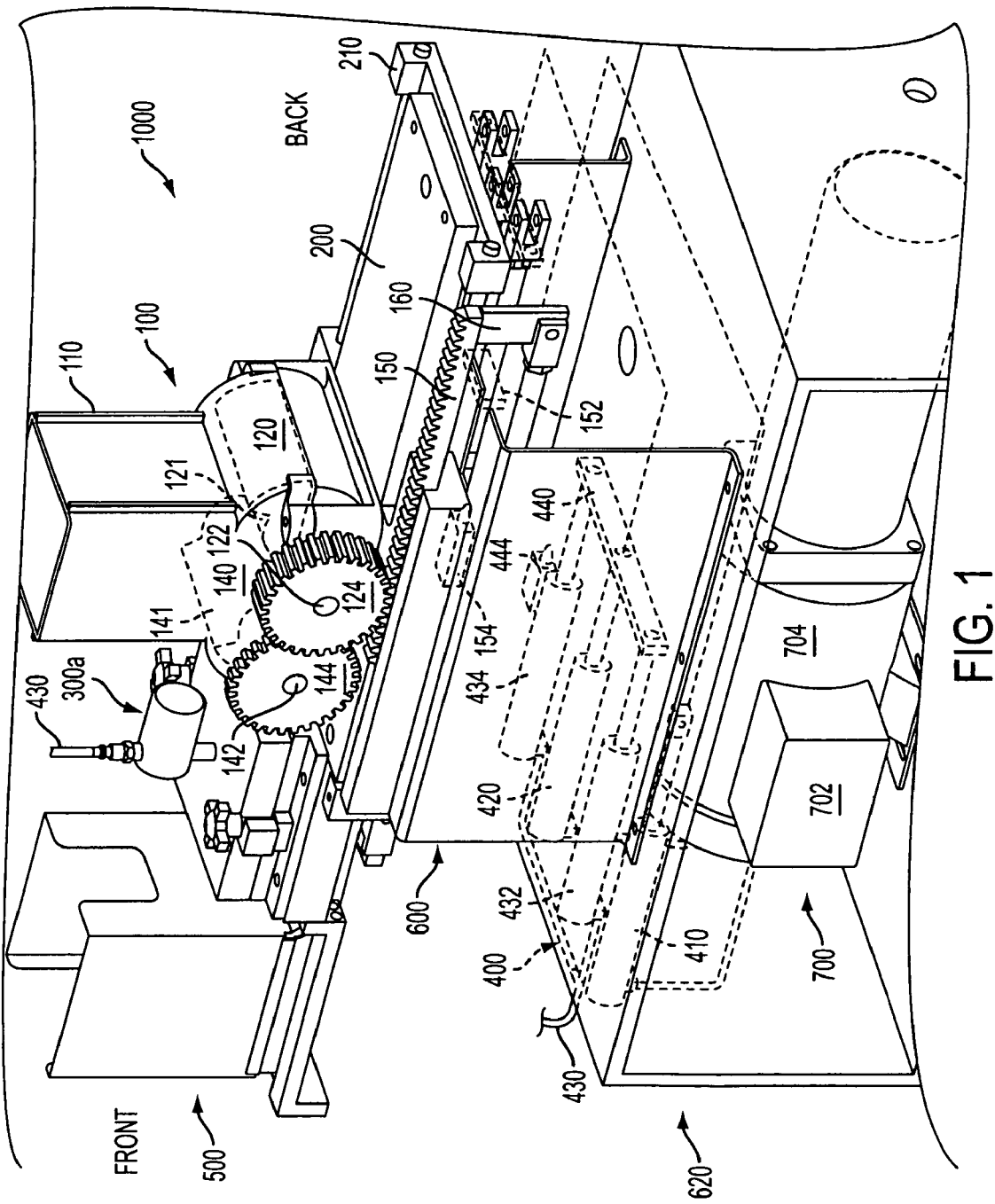
FIG. 1 shows and embodiment of the present invention.

An exemplary embodiment will now be described with reference to FIG. 1 showing a food portioning system 1000. Generally, the food portioning system 1000 includes a hopper assembly 100, mold pate 200, shuttle 210, air knockout assembly 300a, a set of air and hydraulic cylinders 400, and a paper feeder 500 disposed at a support frame 600. The support frame 600 is disposed on a base 620 wherein a drive unit 700 is disposed.

Figure 8:
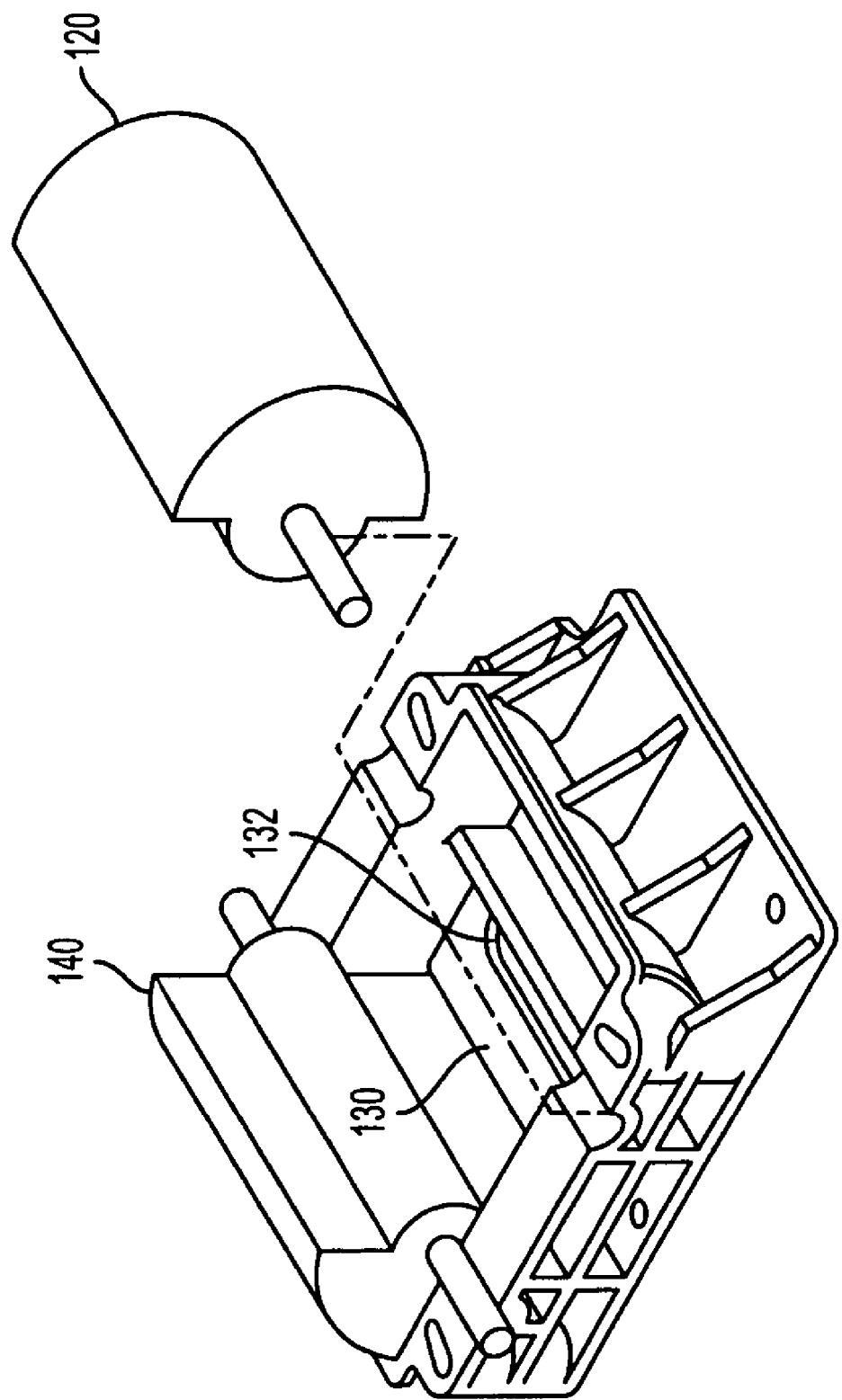
FIG. 8 shows the bottom of the hopper assembly and the tumblers.
Figure 9:
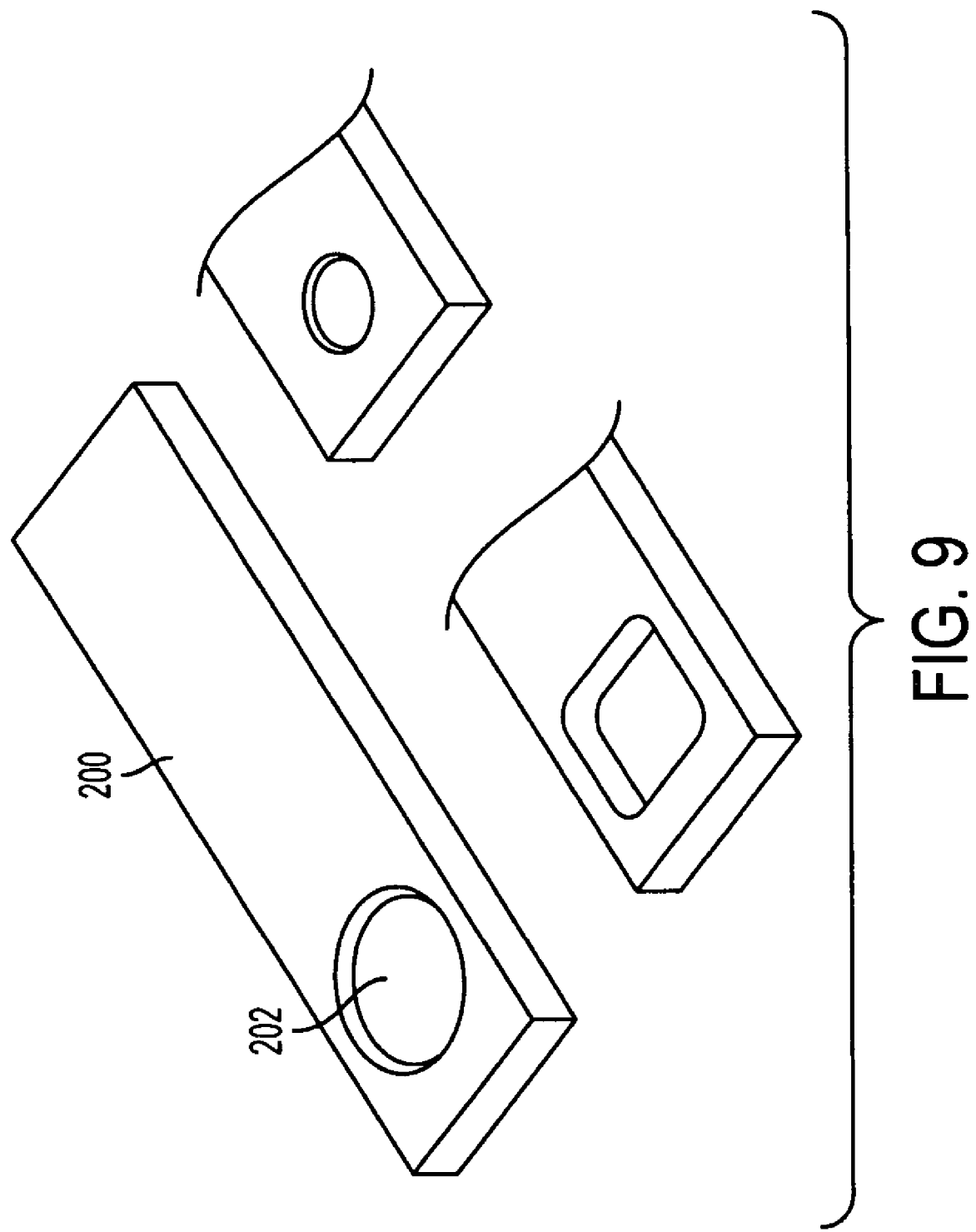
FIG. 9 shows various mold plate embodiments.

The hopper assembly 100 includes a hopper 110 and a first tumbler 120 and a second tumbler 140 disposed at a base of the hopper 110. At the bottom of the hopper 110, there is a fill cavity 130 and a fill hole 132 (FIG. 8). The first and second tumblers 120, 140 are driven by a drive shaft 122 and a support shaft 142, respectively. The first and second tumblers 120, 140 respectively have a step 121 and a step 141. A drive gear 124 is disposed at an end of the drive shaft 122 and a support gear 144 is disposed at an end of the support shaft 142. The drive gear 124 and the support gear 144 are coupled together, while only the drive gear 124 is coupled to the gear rack 150. An end of the gear rack 150 is attached to a first hydraulic cylinder 410 of the set of air and hydraulic cylinders 400 by a connecting member 160.

Figure 2:
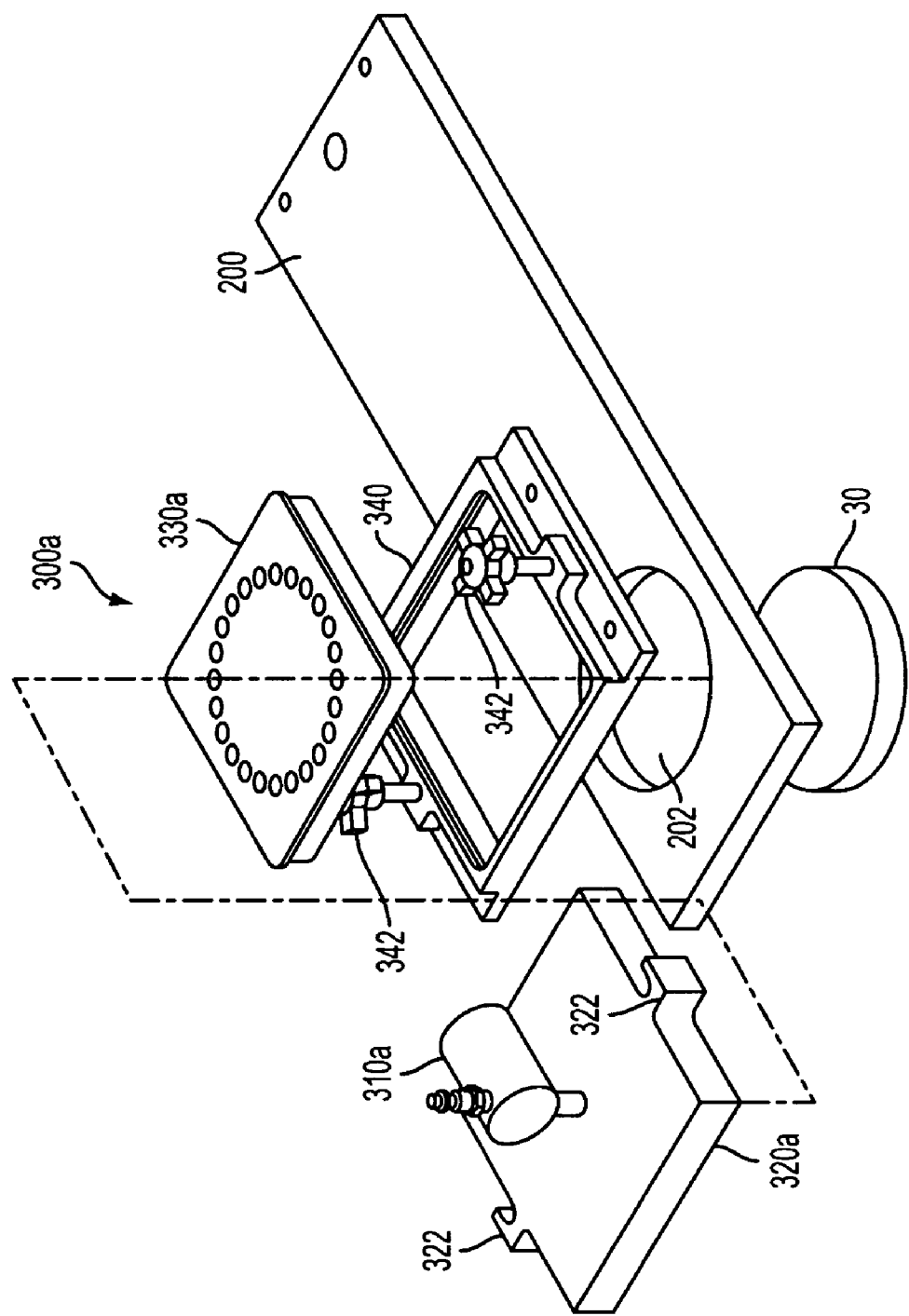
FIG. 2 is a perspective view of the air knockout assembly.
Figure 5:
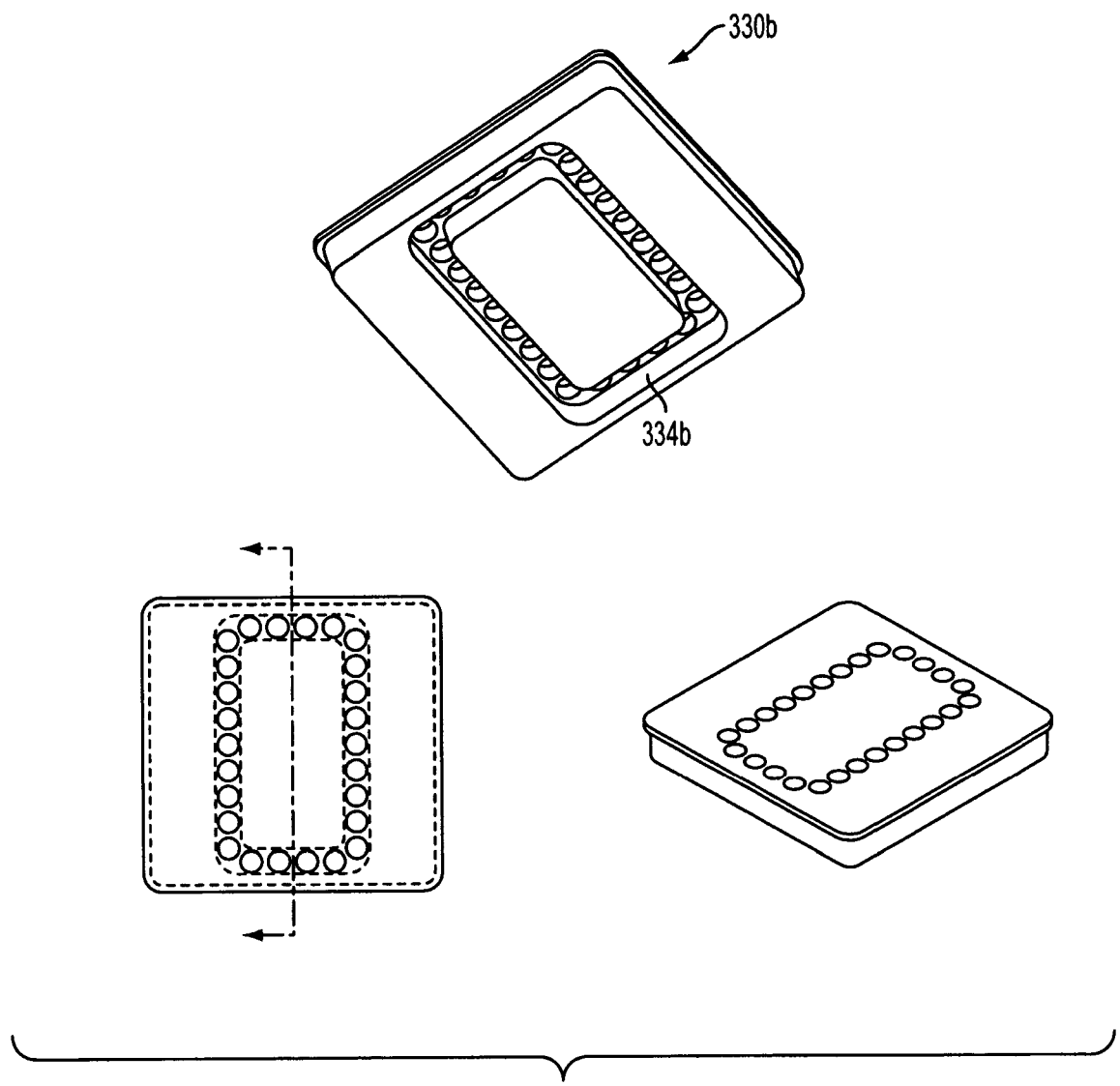
FIG. 5 shows perspective views of another embodiment of the air knockout member.
Figure 6:
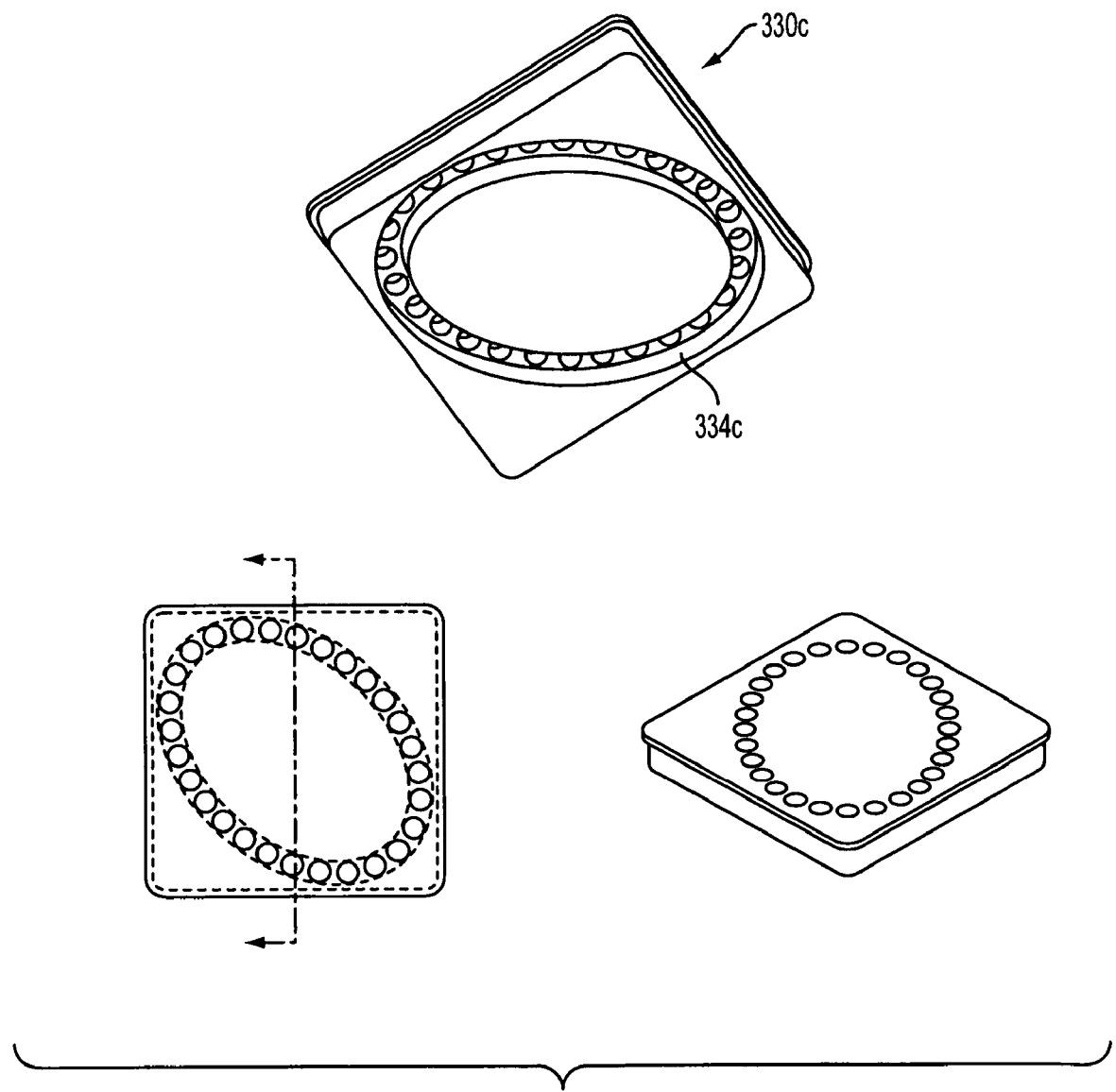
FIG. 6 shows perspective views of yet another embodiment of the air knockout member.

Underneath the hopper assembly 100, there is a moveable shuttle 210. The mold plate 200 is attached to the shuttle 210 while the shuttle 210 is slideably disposed with respect to the support frame 600. The mold plate 200 includes a mold cavity 202 (FIG. 2). Although the mold cavity 202 is shown to have a circular shape, the mold cavity can have other shapes, including oval shapes and polygonal shapes (FIGS. 5, 6). The mold plate 200 can be easily replaced depending on the shape of portioned food that is desired. The shuttle 210 is coupled to the hydraulic cylinder 420.

Figure 3:
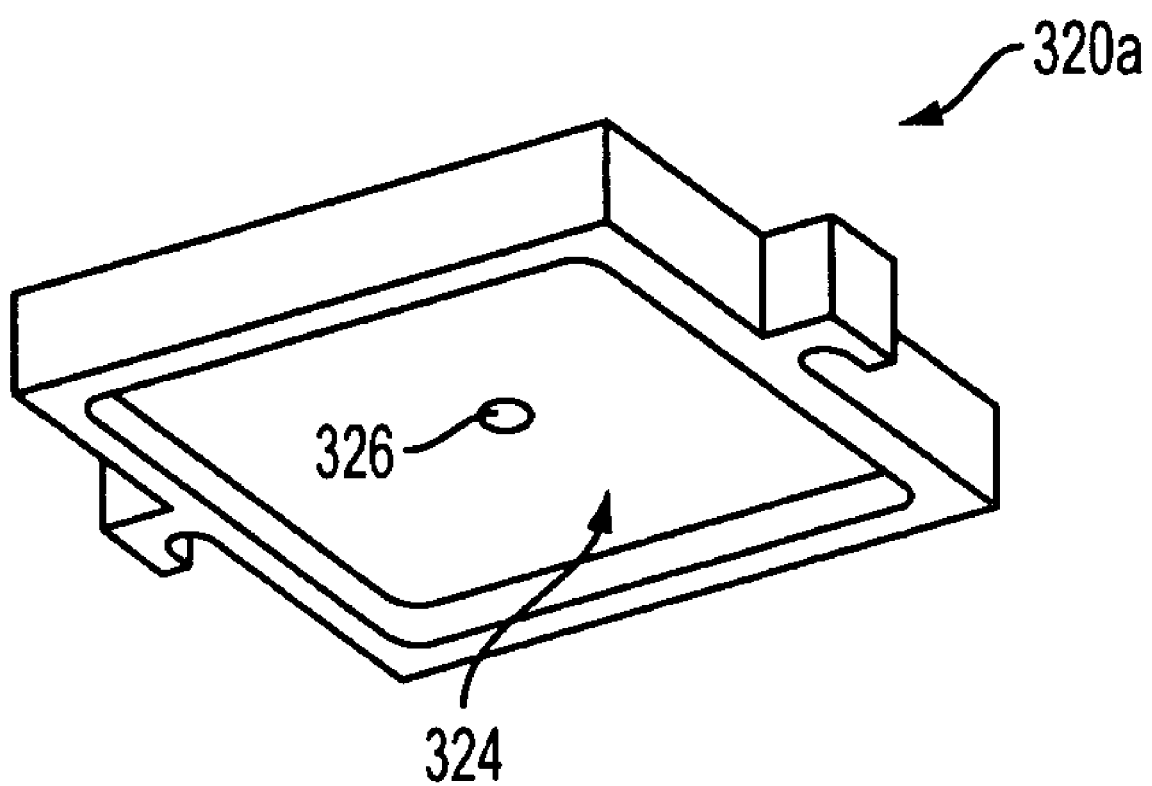
FIG. 3 is a perspective view of the top plate.

Adjacent to the hopper assembly 100, there is the air knockout assembly 300a shown in FIGS. 1, 2, and 3. The air knockout assembly 300a includes a valve 310a communicating with a top plate 320a. The valve 310a may be any kind of an electrically actuated valve, including solenoid valves, for example. One end of the valve 310a communicates with an air cavity 324 of the top plate 320a via an air vent 326. Another end of the valve 310a communicates with an air line 430. Underneath the top plate 320a is an air knockout member 330a. The air knockout member 330a is a part that can be easily replaced depending on the shape of the portioned food in the mold cavity 202. Below the air knockout member 330a is a base plate 340. The base plate 340 includes clamping means 342 to firmly attach the top plate 320a to the base plate 340.

Alternatively, a separate air knockout member 330a is not required, but another means fixed to the top plate 320a or to the base plate 340 may be used to vent the compressed air onto the portioned food in the mold cavity 202.

Figure 4:
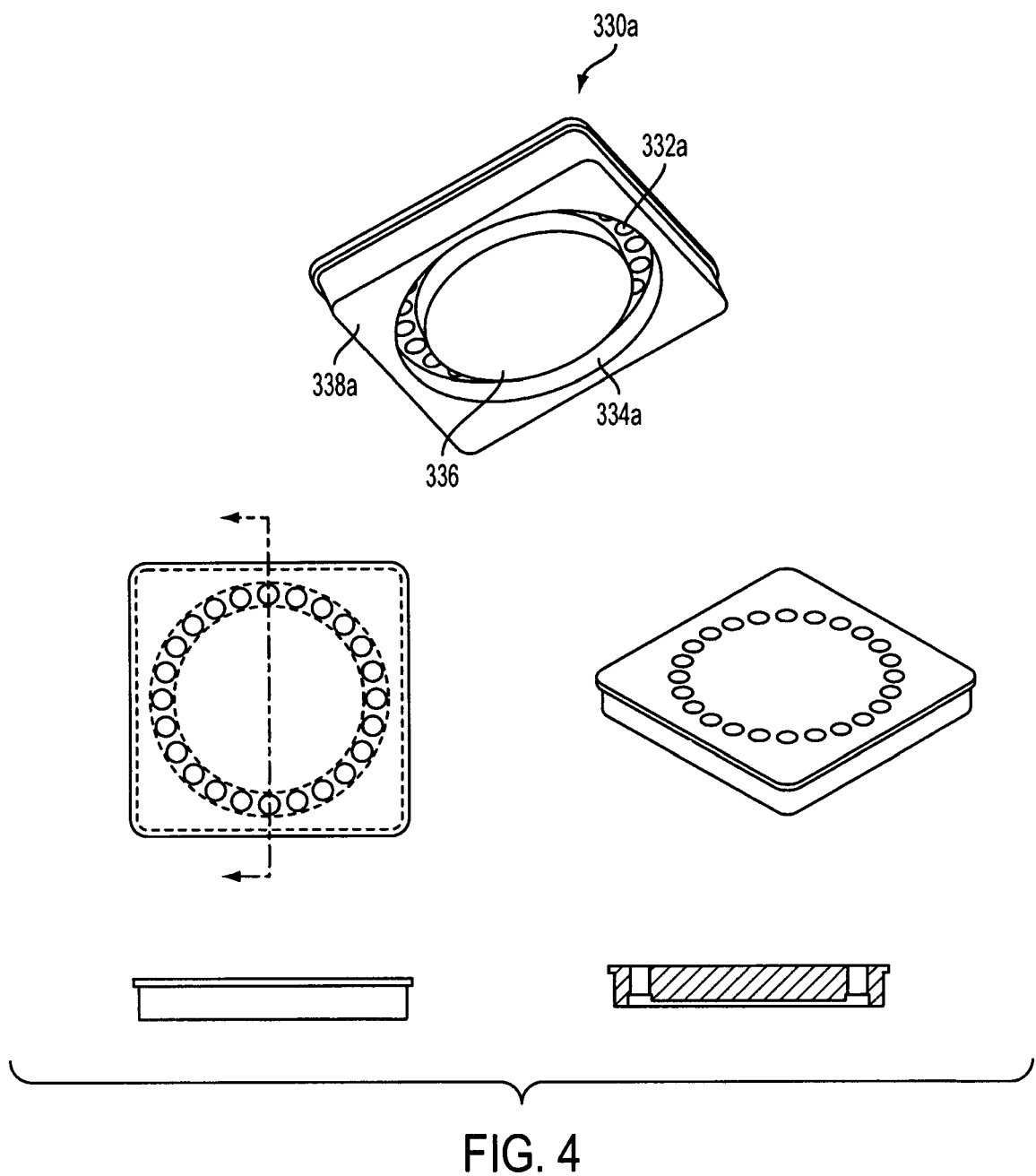
FIG. 4 shows perspective views of the air knockout member.

As shown in FIGS. 2 and 4, the air knockout member 330a in the current embodiment has a plurality of vents 332a disposed in a substantially circular shape. At the bottom of the air knockout member 330a, there is a channel 334a having substantially the same shape as the shape of the plurality of vents 332a. Inside the plurality of vents 332a, there is an inner portion 336. At the outer periphery of the air knockout member 330a, there is an outer portion 338a. The inner portion 336 has a depth less that is less than the depth of the outer portion 338a, for reasons to be explained later.

The shape of the plurality of vents 332a of the air knockout member 330a is not limited to a substantially circular shape, but can have a substantially polygonal shape (plurality of vents 334b as shown in the air knockout member 330b in FIG. 5), or a substantially oval shape (plurality of vents 334c as shown in the air knockout member 330c in FIG. 6). The shape of the plurality of vents is not limited to the shapes shown but can have other shapes.

Adjacent to the air knockout assembly 300a, there is a paper feeder 500. The paper feeder 500 is of the type conventionally used in food portioning machines such as hamburger patty machines.

There is a set of air and hydraulic cylinders 400 disposed underneath the hopper assembly 100, shuttle 210, and the air knockout assembly 300a. The set of air and hydraulic cylinders 400 generates compressed air without requiring an outside supply of compressed air. The set of air and hydraulic cylinders 400 include a first hydraulic cylinder 410 which drives the gear rack 150 and a second hydraulic cylinder 420 which drives the shuttle 210. The set of air and hydraulic cylinders 400 also include a first air cylinder 432 and a second air cylinder 434. The extendable shafts of the first and second air cylinders 432, 434 are coupled to the extendable shaft of the second hydraulic cylinder 420 by a crossbar 440. The air cylinders 432, 434 are both connected to the air line 430. Alternatively, other means known in the art for driving the hopper assembly 100 and the shuttle 210 and other means known in the art for generating compressed air may be employed. For example, instead of the first and second hydraulic cylinders 410, 420, there may be a first driving means and a second driving means whose actions generate compressed air with or without a compressed air generator.

The hopper assembly 100, shuttle 210, air knockout assembly 300a, set of air and hydraulic cylinders 400, paper feeder 500 are all disposed on a support frame 600. The support frame 600 is disposed on a base 620. The base 620 includes a drive unit 700. The drive unit 700 includes a programmable logic controller (PLC) 702 and a fluid pump 704. The PLC 702 is connected to the valve 310a (FIG. 2), first and second hydraulic cylinders 410, 420, and to a number of sensors, e.g., optical and/or mechanical sensors such as limit switches, disposed on the food portioning system 1000.

An operation of the food portioning system 1000 is described below.

First, flowable food material is put into the hopper 110. Through the control of the PLC 702, the fluid pump 704 drives the first hydraulic cylinder 410 to extend its shaft to shift the gear rack 150 toward the back of the food portioning system 1000. As the gear rack 150 is extended out to a first position, the drive gear 124 is rotated in one direction. The support gear 144 coupled to the drive gear 124 is rotated in an opposite direction. The drive gear 124 rotates the first tumbler 120 and the support gear 144 rotates the second tumbler 140. The movement of the gear rack 150 out to the first position serves to rotate the first and second tumblers 120, 140 inward. Consequently, the steps 121, 141 of the first and second tumblers 120, 140 push in a portion of the food material to the fill cavity 130. At this point, the food material is not yet pushed out of the fill hole 132.

Next, the fluid pump 704 drives the second hydraulic cylinder 420 to extend its shaft and displace the shuttle 210 toward the first fill position. When the second hydraulic cylinder 420 is fully extended, the mold cavity 202 of the mold plate 200 is disposed underneath the fill hole 132.

Because the end of the shaft of the second hydraulic cylinder 420 is connected to the shafts of the first and second air cylinders 432, 434, the extension of the second hydraulic cylinder shaft draws out the shafts of the first and second air cylinders 432, 434 to generate compressed air inside the first and second air cylinders 432, 434. The compressed air is then channeled to the air line 430.

Then, the gear rack 150 is further extended toward the back to a second position to further rotate the first and second tumblers 124, 144. The further rotation of the first and second tumblers 124, 144 pushes the food material in the fill cavity 130 out through the fill hole 132 to fill in the mold cavity 202 of the mold plate 200.

It is noted that the movement of the gear rack 150 to the second position may start as soon as a portion of the mold cavity 202 is disposed directly underneath the fill hole 132. In other words, the center of the mold cavity 202 need not be disposed under the fill hole 132 for the tumblers 124, 144 to start filling the mold cavity 202. Rather, the food material may be pushed out the fill hole 132 while the mold cavity 202 is moving.

After the mold cavity 202 is filled with a portioned amount of food material, the shaft of the second hydraulic cylinder 420 shaft is retracted to displace the shuttle 210. The mold cavity 202 of the mold plate 200 is moved to a knockout out position underneath the air knockout assembly 300a.

The retraction of the shaft of the second hydraulic cylinder 420 also retracts the shafts of the first and second air cylinders 432, 434 to generate compressed air.

The air valve 300a is opened to allow compressed air generated by the air cylinders 432, 434, to flow into the top plate 320a of the air knockout assembly 300a. The plurality of vents of the 332a of the air knockout member 330a directs some of the compressed air to about the periphery of the portioned food in the mold cavity 202 to knock out the portioned food out of the mold plate 200. The channel 334a allows an even application of air pressure at about the periphery of the portioned food. Because the inner portion 336 has less depth than the outer portion 338a of the air knockout member 330a, there is an air gap between the bottom surface of the inner portion 336 of the air knockout member 330 and the top of the portioned food in the mold cavity 202. The air gap channels some of the compressed air toward the middle or center portion of the portioned food. The air gap thus prevents the middle or the center portion of the portioned food from sticking to the air knockout member 330a and provides additional knockout pressure at the middle of the mold cavity 202.

When the shaft of the second hydraulic cylinder 420 is retracted, the gear rack 150 is retracted as well, to rotate the steps 121, 141 of the first and second tumblers 120, 140 outwardly to receive more food material.

After the portioned food is knocked out of the mold plate 200, the shaft of the second hydraulic cylinder 420 is extended again to move the mold cavity 202 of the mold plate 200 toward the fill position.

To detect the movement of the various components of the food portioning system 1000, including the motion of the gear rack 150 and the shuttle 210, there is a plurality of sensors.

For example, the food portioning system 1000 includes a switch lever 152 attached to an end of the gear rack 150. A sensor 154 is disposed on the support frame 600 and aligned with the switch lever 152. The sensor 154 is connected to the PLC 702 so when the gear rack 160 is retracted to the front by a predetermined amount, the sensor 154 is triggered to send a signal to the PLC 702. When PLC 702 receives the signal, the PLC 702 sends a control signal to a valve of the drive unit 700 to stop retracting and a control signal to extend the shaft of the first hydraulic cylinder 410.

It noted that the sensor 154 can be disposed anywhere on the food portioning machine 1000 as long as the sensor detects the motion of the gear rack 150 or any components attached thereto.

As another example of a sensor used to detect a motion of a component of the food portioning system 1000, there is a sensor 444 disposed underneath the support frame 600 and aligned with the crossbar 440. When the shaft of the second hydraulic cylinder 420 is retracted to a predetermined distance, the crossbar 440 triggers the sensor 444 to send a signal to the PLC 702. The movement of the second hydraulic cylinder 420 by the predetermined distance corresponds to the positioning of the mold cavity 202 underneath the air knockout assembly 300a. Therefore, the PLC 702 sends a signal to the valve 310a to release a predetermined amount of compressed air into the top plate 320a of the air knockout assembly 300a to knock out the portioned food material out of the mold cavity 202.

The location of the sensor 444 is not limited to the location shown in FIG. 1, but can be disposed anywhere on the food portioning system 1000 as long as the motion of the shuttle 210 is detected.

In the above embodiment of the air knockout assembly 300a, the release of the compressed air through the valve 310a to the air knockout assembly 300a is triggered, at least in part, electrically by the action of the sensor 444. Alternatively, the release of the compressed air is triggered mechanically.

Figure 7:
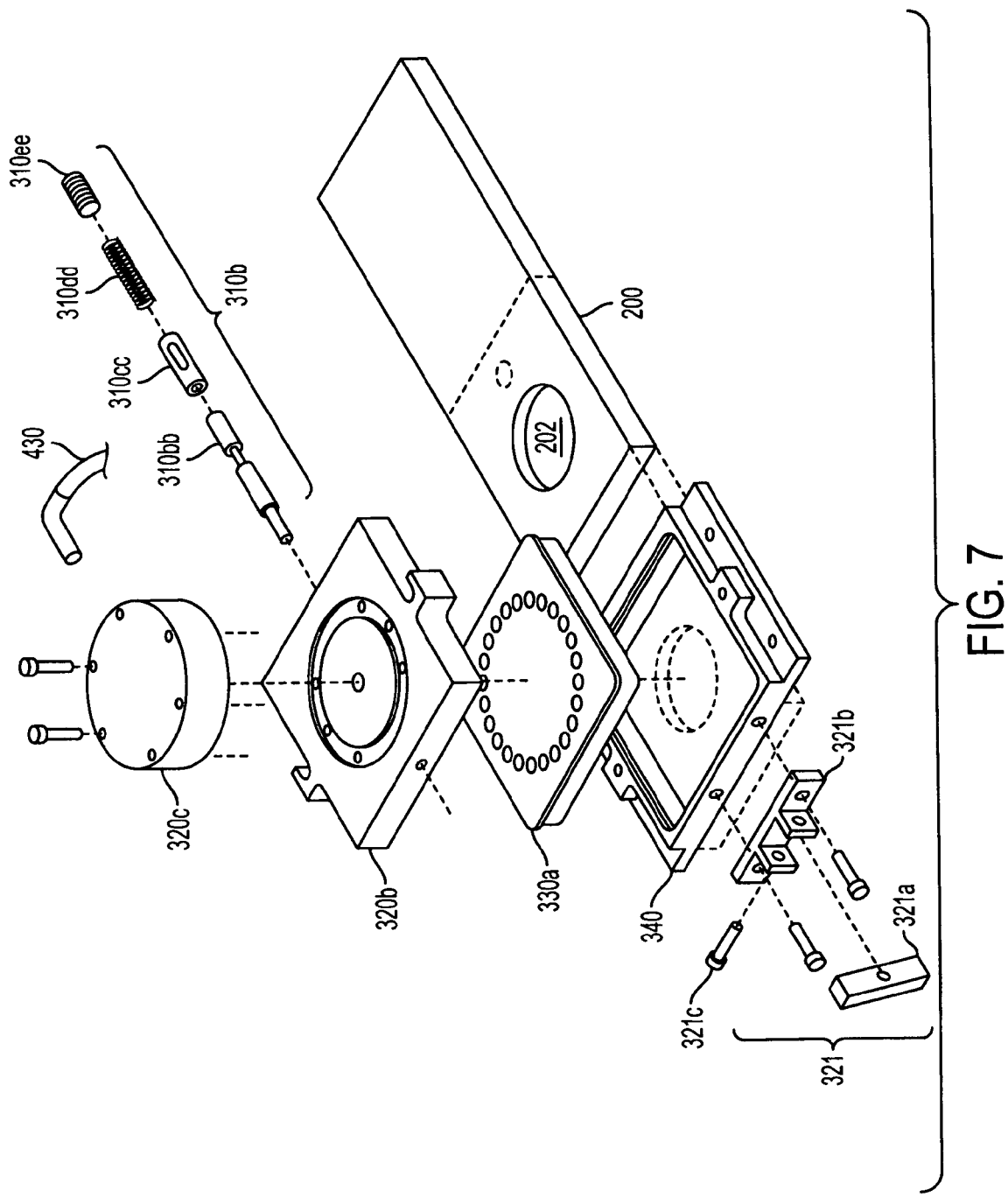
FIG. 7 is a view of another embodiment of the air knockout assembly.

An air knockout assembly 300b is shown in FIG. 7. Instead of the top plate 320a, there is a top plate 320b disposed above the base plate 340, with a cap 320c disposed above the top plate 320b. The air line 430 is connected to the cap 320c (FIG. 7A).

Alternatively, the cap 320c is connected to a feed line 325 and the feed line 325 is connected to an air reservoir 311. In this alternative embodiment, the air reservoir 311 is connected to the air line 430.

A switch 321 is pivotally mounted at a side of the base plate 340. The switch 321 includes a lever 321a, a lever bracket 321b, and a lever pivot pin 321c. One end of the lever 321a is disposed to contact the front end of the mold plate 200 and the opposite end of the lever 321a is disposed at a valve 310b. The valve 310b includes an air valve spool 310bb, a sleeve 310cc, a compression spring 310dd, and an end cap 310ee. Unlike the top plate 320a, top plate 320b includes the valve 310b to mechanically control the release of compressed air into the air cavity 324.

Here, when the mold cavity 202 is positioned under the air knockout assembly 300b, the mold plate 200 pushes an end of the lever 321a to push the air valve spool 310bb into the top plate 320b to release compressed air inside the reservoir 327 into the air cavity 324 of the top plate 320b.

In another embodiment of the present invention, a food portioning system includes a hopper, a mold plate, a set of air and hydraulic drive means, and at least two air knockout assemblies. In this embodiment, the mold plate is longer than the mold plate 200 and has a mold cavity disposed at both ends of the mold plate. Each of the two air knockout assemblies are disposed at opposite sides of the hopper. In all other respects, this embodiment is substantially similar to the food portioning system 1000. Because the mold plate has two mold cavities, a first mold cavity and a second mold cavity, the first mold cavity can be filled while the portioned food in the second mold cavity is knocked out. When the empty second mold cavity is moved to a fill position, the first mold cavity is moved out to a knockout position under the other air knockout assembly.

Through the use of air knockouts and a set of air and hydraulic cylinders, food portioning system of the present invention can efficiently output portioned food at a high rate without the maintenance and safety issues associated with the conventional food portioning machine. As an added benefit, the use of the air knockout member allows for the precise knockout of portioned food, such as hamburger patties, to the same horizontal position below the air knockout assembly. This allows a number of hamburger patties, for example, to be vertically stacked evenly.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A system for making portioned food, the system comprising:
    a hopper assembly comprising a tumbler;
    an air knockout assembly disposed adjacent to said hopper assembly, said air knockout assembly comprising an air vent member;
    a mold plate having a mold cavity, said mold plate slideably disposed under said hopper assembly and said air knockout assembly;
    a plurality of cylinders comprising:
    a first hydraulic cylinder coupled to said tumbler of the hopper assembly;
    a second hydraulic cylinder having a shaft which is coupled to and which drives said mold plate; and
    an air cylinder having a shaft that is connected to a shaft of said second hydraulic cylinder, said shaft of said air cylinder generating compressed air for said air knockout assembly while the second hydraulic cylinder drives the mold plate; and
    a control circuit controlling operations of the system.

2. The system of claim 1, wherein the control circuit drives said second cylinder to reciprocatively drive said mold cavity of the mold plate to one of a fill position below said hopper assembly and a knockout position below said air knockout assembly.

3. The system of claim 2, wherein when said mold cavity is driven to said fill position, said first hydraulic cylinder drives said tumbler to push food out of said hopper assembly into said mold cavity.

4. The system of claim 2, wherein said air cylinder generates compressed air, and the compressed air is channeled to the air knockout assembly to knock out said portioned food out of said mold cavity disposed to said knockout position.

5. A system for making portioned food, the system comprising:
   a hopper assembly comprising a tumbler;
   an air knockout assembly disposed adjacent to said hopper assembly, said air knockout assembly comprising an air vent member;
   a mold plate having a mold cavity, said mold plate slideably disposed under said hopper assembly and said air knockout assembly;
   a plurality of cylinders comprising:
      a first hydraulic cylinder coupled to said tumbler of the hopper assembly;
      a second hydraulic cylinder coupled to said mold plate; and
      an air cylinder connected to said second hydraulic cylinder, said air cylinder generating compressed air for said air knockout assembly; and
   a control circuit controlling operations of the system,
   wherein said control circuit drives said second cylinder to drive said mold cavity of the mold plate to one of a fill position and to a knockout position,
   said first hydraulic cylinder drives said tumbler to push food material out of said hopper into said mold cavity of said mold plate at said fill position,
   said second hydraulic cylinder drives said mold plate to the knockout position,
   said air cylinder generates compressed air, and
   said compressed air is channeled to said air knockout assembly to knock out said portioned food out of said mold cavity.

6. The system of claim 5, wherein movements of the first and the second hydraulic cylinders are synchronized such that said first hydraulic cylinder drives said tumbler to push food material out of said hopper when said second hydraulic cylinder moves said mold plate to said fill position.

7. A food portioning apparatus comprising:
   means for receiving and ejecting food into a mold cavity of a mold plate;
   means for pushing out portioned food using pneumatic pressure;
   a plurality of driving means comprising:
      first means for driving said means for receiving and ejecting food to at least one of a first position under said means for receiving and ejecting food and a second position under means for pushing out portioned food;
      second means for driving said mold plate; and
      third means for generating compressed air for said means for pushing out portioned food, said third means connected to said second means by a connecting means for connecting said second and third means and for causing said second means to drive said mold plate while said third means generates the compressed air; and
   means for controlling operations of said system.

8. The system of claim 2, wherein the tumbler rotates about an axis to push food out of said hopper assembly.

9. The system of claim 1, wherein the air cylinder generates the compressed air without requiring an outside supply of compressed air.

10. The system of claim 1, wherein the shaft of the air cylinder being coupled to the shaft of the second hydraulic cylinder directly through a crossbar.

11. The food portioning apparatus of claim 7, wherein the third means for generating compressed air generates the compressed air by compressing air inside a cylinder.

12. The food portioning apparatus of claim 1, wherein the second hydraulic cylinder is connected to a fluid pump and the air cylinder is connected to the fluid pump.

* * * * *